United States Patent
Hiraguchi et al.

(10) Patent No.: US 7,360,982 B2
(45) Date of Patent: Apr. 22, 2008

(54) STRUCTURE FOR HOLDING RECORDING TAPE CARTRIDGE AND METHOD OF MANUFACTURING SAID STRUCTURE

(75) Inventors: Kazuo Hiraguchi, Kanagawa (JP); Wataru Iino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 419 days.

(21) Appl. No.: 10/698,392

(22) Filed: Nov. 3, 2003

(65) Prior Publication Data

US 2004/0109259 A1 Jun. 10, 2004

(30) Foreign Application Priority Data

Dec. 10, 2002 (JP) .............................. 2002-358287

(51) Int. Cl.
*B65G 1/06* (2006.01)
(52) U.S. Cl. ........................................ 414/280; 360/94
(58) Field of Classification Search ................ 414/280, 414/282; 206/307, 387.1, 307.1, 387.14, 206/387.15; 360/92, 94
See application file for complete search history.

(56) References Cited

U.S. PATENT DOCUMENTS

| | | | | |
|---|---|---|---|---|
| 3,849,798 A | * | 11/1974 | Ono ............................ 360/94 |
| 3,864,743 A | * | 2/1975 | Staar .......................... 360/94 |
| 4,984,108 A | | 1/1991 | Grant et al. |
| 5,325,255 A | * | 6/1994 | Dodt et al. .................. 360/132 |
| 5,692,623 A | * | 12/1997 | Todor et al. .................. 360/94 |
| 5,867,476 A | * | 2/1999 | Yoshida et al. ............. 720/720 |
| 6,082,554 A | * | 7/2000 | Ostwald ................... 211/41.12 |
| 6,141,180 A | * | 10/2000 | Smith ........................ 360/96.5 |
| 6,244,677 B1 | * | 6/2001 | Millhiser et al. ........... 312/9.48 |
| 6,454,509 B1 | * | 9/2002 | Kappel et al. ............... 414/280 |
| 6,669,431 B1 | * | 12/2003 | Falace et al. ................ 414/280 |
| 6,813,144 B2 | * | 11/2004 | Tango ......................... 361/679 |
| 6,854,679 B2 | * | 2/2005 | Hiraguchi ................... 242/348 |
| 6,908,056 B2 | * | 6/2005 | Hiraguchi ................... 242/348 |
| 6,964,390 B2 | * | 11/2005 | Iino ............................ 242/348 |
| 7,002,772 B2 | * | 2/2006 | Yardy .......................... 360/92 |
| 7,007,293 B2 | * | 2/2006 | Lim et al. .................... 720/730 |
| 2002/0006030 A1 | * | 1/2002 | Evanson et al. ............. 361/724 |
| 2005/0237662 A1 | * | 10/2005 | Chamorro et al. ............ 360/93 |

FOREIGN PATENT DOCUMENTS

| | | | |
|---|---|---|---|
| JP | 59223607 A | * | 12/1984 |
| JP | 07-006465 A | | 1/1995 |
| JP | 07006465 A | * | 1/1995 |

* cited by examiner

*Primary Examiner*—Saul Rodriguez
*Assistant Examiner*—Charles Greenhut
(74) *Attorney, Agent, or Firm*—Sughrue Mion, PLLC

(57) ABSTRACT

Various types of recording cartridges, each of which has a case which rotatably accommodates a reel on which a recording tape is wound, are provided with grasped portions with concave portions at side walls of the case and which a grasping device of a same, external library with accommodating chambers can grasp from both sides. A height from a floor surface of the accommodating chamber to the grasped portions when the cartridge is accommodated in the accommodating chamber of the library is made to be the same regardless of a type of the recording tape cartridge, and an interval between a pair of corner portions of the grasped portions, which corner portions are near a removal opening of the library, are made to be the same regardless of the cartridge type. A pair of corner portions of the grasped portions, which corner portions are deeper in the library, are chamfered.

12 Claims, 11 Drawing Sheets

F I G . 6
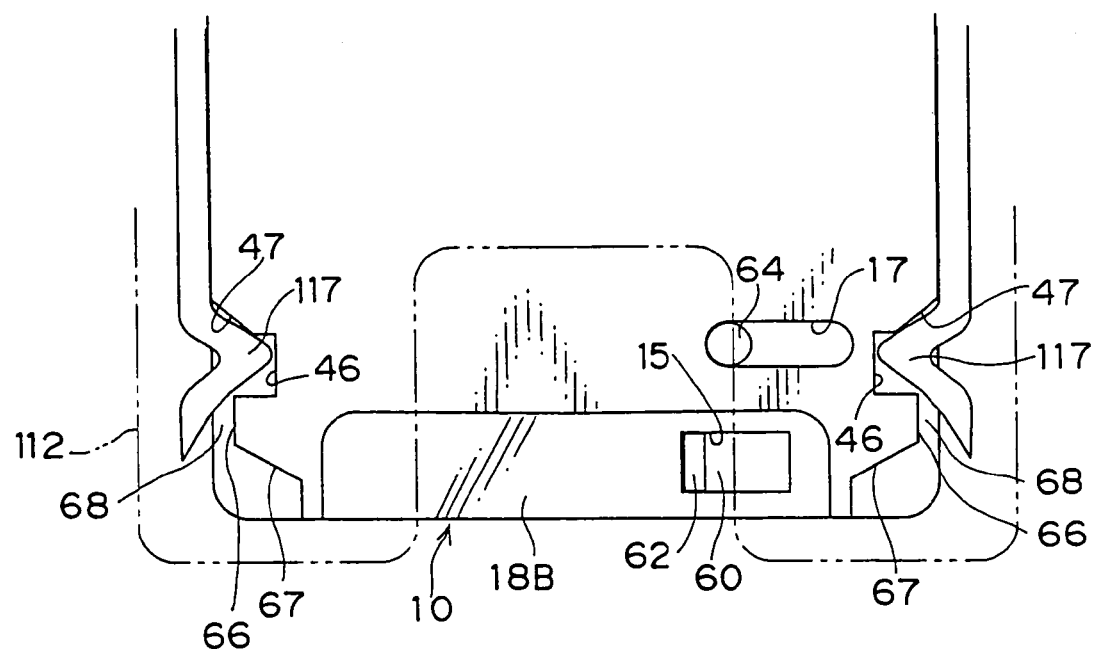

STRUCTURE FOR HOLDING RECORDING TAPE CARTRIDGE AND METHOD OF MANUFACTURING SAID STRUCTURE

CROSS-REFERENCE TO RELATED APPLICATION

This application claims priority under 35 USC 119 from Japanese Patent Application No. 2002-358287, the disclosure of which is incorporated by reference herein.

BACKGROUND OF THE INVENTION

1. Technical Field

The present invention relates to a structure for holding a tape cartridge; the tape cartridge has a case and a single reel which is contained in the case and around which a recording tape such as a magnetic tape used as a record reproducing medium for a computer, is wound.

2. Description of the Related Art

A magnetic tape cartridge is known that includes a single reel which is contained in a case and around which a magnetic tape used as a data record reproducing medium for a computer is wound, is conventionally known. A leader member, such as a leader block, leader pin or leader tape, is fixed to a leading end of the magnetic tape. The leader member is drawn from the magnetic tape cartridge by a drawing device provided in a drive system. The magnetic tape fastened to the leader member is wound around a take-up reel of the drive system.

In addition, a reel gear is inscribed in an annular shape at a center of a lower surface of the reel, which is exposed through the hole formed at a lower surface of the magnetic tape cartridge. A driving gear provided on a rotating shaft of the drive system is engaged with the reel gear to rotate the reel. Data is recorded onto the magnetic tape and the recorded data is reproduced by synchronously rotating the reel of the magnetic tape cartridge and the take-up reel of the drive system.

Usually, a large number of recording tape cartridges having such a structure are accommodated in an accommodating rack called a library. There are a library 100 having a robot hand 70 which serves as a grasping device which grasps the both side walls of a recording tape cartridge 108 as shown in FIG. 10; a library 110 having a robot hand 80 which serves as a grasping device which grasps (nips) the top and bottom surfaces at the rear wall side of a recording tape cartridge 118 as shown in FIG. 11; and the like. The desired recording tape cartridge 108, 118 is automatically removed from an accommodating chamber 102, 112 by the robot hand 70, 80 or the like, and is conveyed to and loaded in one of plural drive devices 90, such that recording/playback of data is carried out (see, for example, Japanese Patent Application Laid-Open (JP-A) No. 7-6465).

Namely, the robot hand 70 is structured so as to freely move in the vertical direction and in the horizontal direction by guide rails 76, 78 and the like. The robot hand 80 is structured so as to freely move in the vertical direction and in the horizontal direction by guide rails 86, 88 and the like. The robot hands 70, 80 can thereby be disposed so as to oppose the respective accommodating chambers 102, 112 of the libraries 100, 110 and respective loading openings 92 of the drive devices 90. Accordingly, when the desired recording tape cartridge 108, 118 is to be removed from among the plural recording tape cartridges 108, 118, first, the robot hand 70, 80 is moved by the guide rails 76, 78, 86, 88 to the position at which it opposes that recording tape cartridge 108, 118.

Then, the robot hand 70, 80 is moved to advance forward in the horizontal direction. In the case of the robot hand 70 shown in FIGS. 8 and 10, claw portions 72 at the distal end of the robot hand 70 are inserted into grasped portions 106 (which hereinafter may be referred to as "concave portions" upon occasion), which are concave and are provided at both side walls of the recording tape cartridge 108, and the bottom surface of a rear wall 104 side of the recording tape cartridge 108 is supported by a plate-shaped supporting portion 74. In the case of the robot hand 80 shown in FIGS. 9 and 11, the top and bottom surfaces of a rear wall 114 side of the recording tape cartridge 118 are nipped by claw portions 82, 84 which are at the distal end of the robot hand 80.

In this way, the desired recording tape cartridge 108, 118 is grasped by the robot hand 70, 80. Thereafter, due to the robot hand 70, 80 moving so as to withdraw rearward in the horizontal direction, the recording tape cartridge 108, 118 is removed from the accommodating chamber 102, 112 of the library 100, 110.

Note that, in the case of the library 110 shown in FIG. 11, as shown in FIG. 9, claw portions 117, which serve as an anchor device and are provided at both side walls 112B of the accommodating chamber 112, engage with concave portions 116 provided at the both side walls of the recording tape cartridge 118 (i.e., the claw portions 117 are inserted into the concave portions 116), so as to anchor and hold the recording tape cartridge 118. The claw portions 117 project out in a state of being urged toward the inner side of the accommodating chamber 112, and are elastically deformable toward the left and right outer sides (i.e., in the directions of the illustrated arrows S). Accordingly, when the recording tape cartridge 118 is to be removed from the accommodating chamber 112, the claw portions 117 elastically deform appropriately toward the left and right outer sides (in the directions of the illustrated arrows S) so as to come out of the concave portions 116 and permit movement of the recording tape cartridge 118.

In this way, the recording tape cartridge 108, 118 which has been removed from the library 100, 110 is moved to a position opposing the loading opening 92 of the desired drive device 90, and thereafter, is loaded into the drive device 90. Predetermined data is recorded onto the recording tape cartridge 108, 118, or recorded data is played back therefrom.

In this way, a large number of the recording tape cartridges 108, 118 are accommodated in the accommodating chambers 102, 112 of the libraries 100, 110, and are removed and loaded into the drive devices 90 by the robot hands 70, 80. However, for each type of leader member, the recording tape cartridge has a different external size, i.e., front-back direction length, left-right direction width, top-bottom direction height, and the like. (For example, a width V of the recording tape cartridge 108 which has a leader pin is slightly smaller than a width U of the recording tape cartridge 118 which employs a leader block.) Providing the library devices 100, 110 which correspond to the respective recording tape cartridges 108, 118 having different sizes (different types of leader members) presents problems in terms of reducing space and reducing costs.

Moreover, at either of the library 100 or the library 110, when plural types of recording tape cartridges having different sizes (different types of leader members) are accommodated therein (e.g., when the recording tape cartridges 108 and the recording tape cartridges 118 are both accommodated), in a case in which it is not possible to adjust the interval between the claw portions 72 of the robot hand 70 or the interval between the claw portions 82, 84 of the robot hand 80, it is not possible to sufficiently grasp either the recording tape cartridge 108 or the recording tape cartridge 118. An error, such as dropping of the recording tape cartridge 108, 118, may occur, and the recording tape cartridge 108, 118 itself may be damaged.

In addition, in a case in which it is possible to adjust the interval between the claw portions 72 of the robot hand 70 or the interval between the claw portions 82, 84 of the robot hand 80, a step for adjusting the interval between the claw portions 72 or the claw portions 82, 84 for each recording tape cartridge 108, 118 having a different size (a different type of leader member) is needed. Therefore, a loss of time corresponding to such a step arises in the time required for the operation of removing the recording tape cartridge 108, 118 from the library 100, 110 and loading it into the drive device 90.

Still further, the depth of the concave portions 116 formed in the recording tape cartridge 118 accommodated in the library 110 shown in FIG. 11 is formed to be more shallow than the length by which the claw portions 117 project (refer to FIG. 9), in order for the claw portions 117 to be able to easily come out due to elastic deformation (i.e., so as to that claw portions 117 are not inserted-in that deeply). The depth of the concave portions 106 formed in the recording tape cartridge 108 is substantially the same as a length (width) N of the claw portions 72, or is formed to be slightly deeper than that, and is formed to be deeper than the concave portions 116 (see FIG. 8) in order for the claw portions 72 to be inserted in the concave portions 106.

Accordingly, when the recording tape cartridge 108 is accommodated in the library 110, the claw portions 117 which engage with the concave portions 106 are inserted-in deeply by an amount corresponding to the amount of projection thereof. When the recording tape cartridge 108 is pulled out from the accommodating chamber 112 due to the rearward withdrawing movement of the robot hand 80, the claw portions 117 catch on corner portions 107 of the concave portions 106, which corner portions 107 are at a front surface 106A side which is the library accommodating side of the concave portions 106, and cannot be removed smoothly. Because the claw portions 117 are pulled-out forcibly, there is the concern that they may be damaged.

SUMMARY OF THE INVENTION

Thus, an object of the present invention is to provide a structure for holding a recording tape cartridge in which the structure of a grasped portion (a vicinity of a concave portion engaged by a grasping device such as a robot hand or an anchor device provided at an accommodating chamber), which is a portion common to at least libraries of various types of recording tape cartridges having different outer configurations (sizes), is made to be common (is standardized). The applicability (adaptability) of the recording tape cartridge is improved such that the recording tape cartridge can be accommodated in different types of libraries so that, for example, the time for operation can be shortened and costs can be reduced.

In order to achieve the above object, a structure for holding a recording tape cartridge of a first aspect of the present invention is as follows. In order to be able to accommodate, in a same library, different types of recording tape cartridges each having: a case rotatably accommodating a reel around which a recording tape is wound; and grasped portions which are formed in a recessed manner in side walls of the case and which a grasping device of a library can grasp from both sides, a height from a floor surface of an accommodating chamber of the library to the grasped portions at a time when the recording tape cartridge is accommodated in the accommodating chamber is made to be the same regardless of a type of the recording tape cartridge, and an interval between the corner portions of the grasped portions at a removal side of the library is made to be the same regardless of the type of the recording tape cartridge. Further, in this recording tape cartridge grasping portion structure, corner portions of the grasped portions at an accommodating side or the deeper side of the library are chamfered.

In the first aspect of the present invention, the height from the floor surface of the accommodating chamber of the library to the grasped portions, and the interval between the corner portions of the grasped portions at the removal side of the library, are always the same sizes (dimensions), regardless of the type of the recording tape cartridge. Thus, it suffices for the grasping device (robot hand) to have a simple structure which can grasp only cartridges of these sizes (dimensions). An associated reduction in costs can be achieved, and the time required for operation can be shortened.

Moreover, even when the recording tape cartridge is to be accommodated in a library of a different type than the aforementioned library (e.g., even when an anchor device provided at both side walls of the accommodating chamber engages with the grasped portions so as to anchor and hold the recording tape cartridge in the accommodating chamber), because the corner portions of the grasped portions at the accommodating side or the deeper side of the library are chamfered, when the recording tape cartridge is removed from the library, the anchor device easily comes out from the grasped portions, and the recording tape cartridge can be smoothly removed from the library. Accordingly, the applicability (adaptability) of the recording tape cartridge to different types of libraries can be improved. It is possible to reduce costs and reduce space by an amount corresponding to the provision of another library which would otherwise be required.

BRIEF DESCRIPTION OF THE DRAWINGS

FIG. 6 is a schematic explanatory diagram showing grasped portions of the recording tape cartridge and an anchor device of a library.

DETAILED DESCRIPTION OF THE INVENTION

Hereinafter, a recording tape cartridge 10 relating to an embodiment of the present invention will be described on the basis of the drawings. First, the overall structure of the recording tape cartridge 10 will be briefly described, and then, the main portions relating to the present invention will be described in detail. Note that, for convenience of explanation, the direction of loading the recording tape cartridge 10 into a drive device is denoted by arrow A, and this direction is called the forward direction (front side) of the recording tape cartridge 10. Further, the direction of arrow B, which is orthogonal to arrow A, is the rightward direction.

Figure 1:
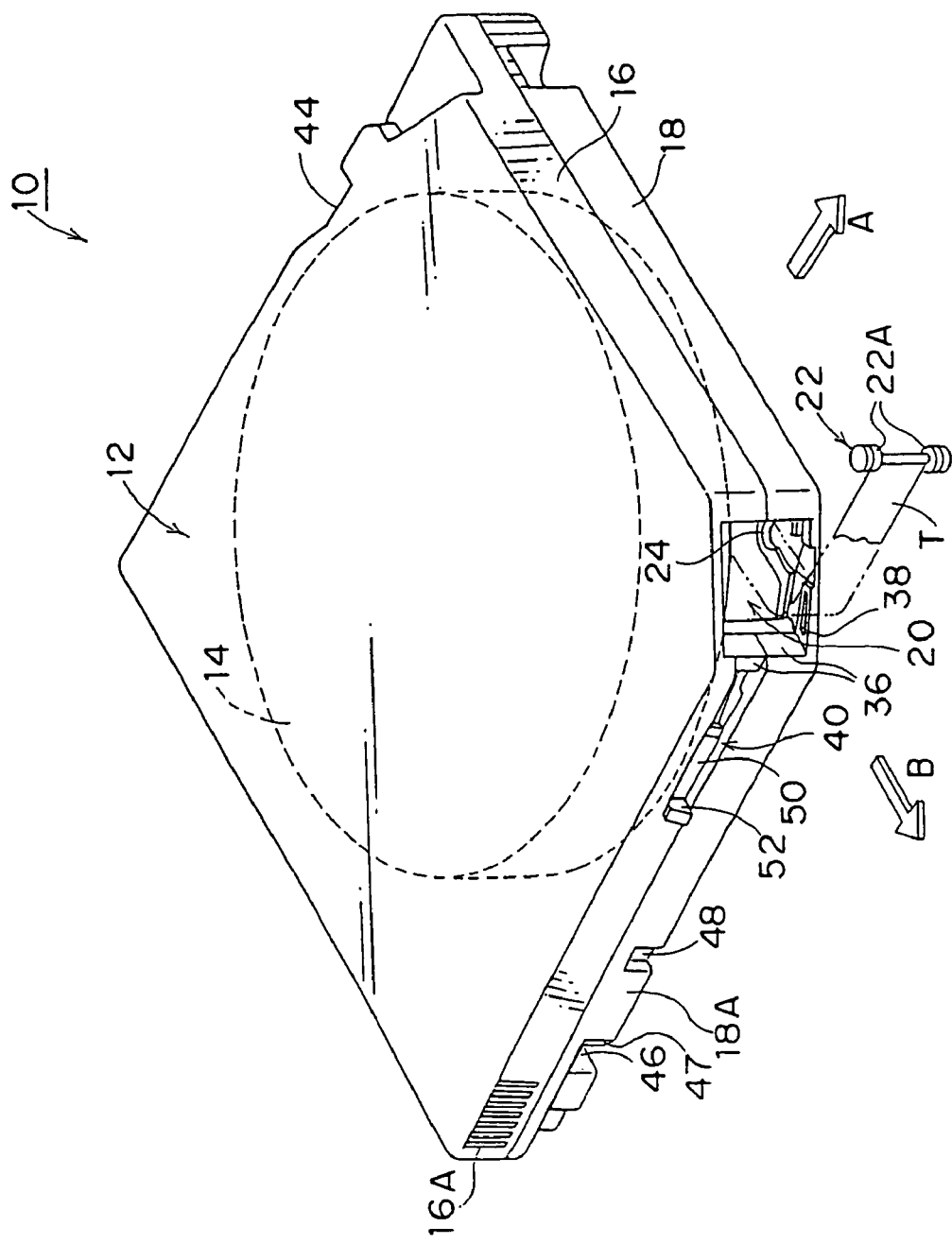
FIG. 1 is a schematic perspective view of a recording tape cartridge viewed from above.
Figure 2:
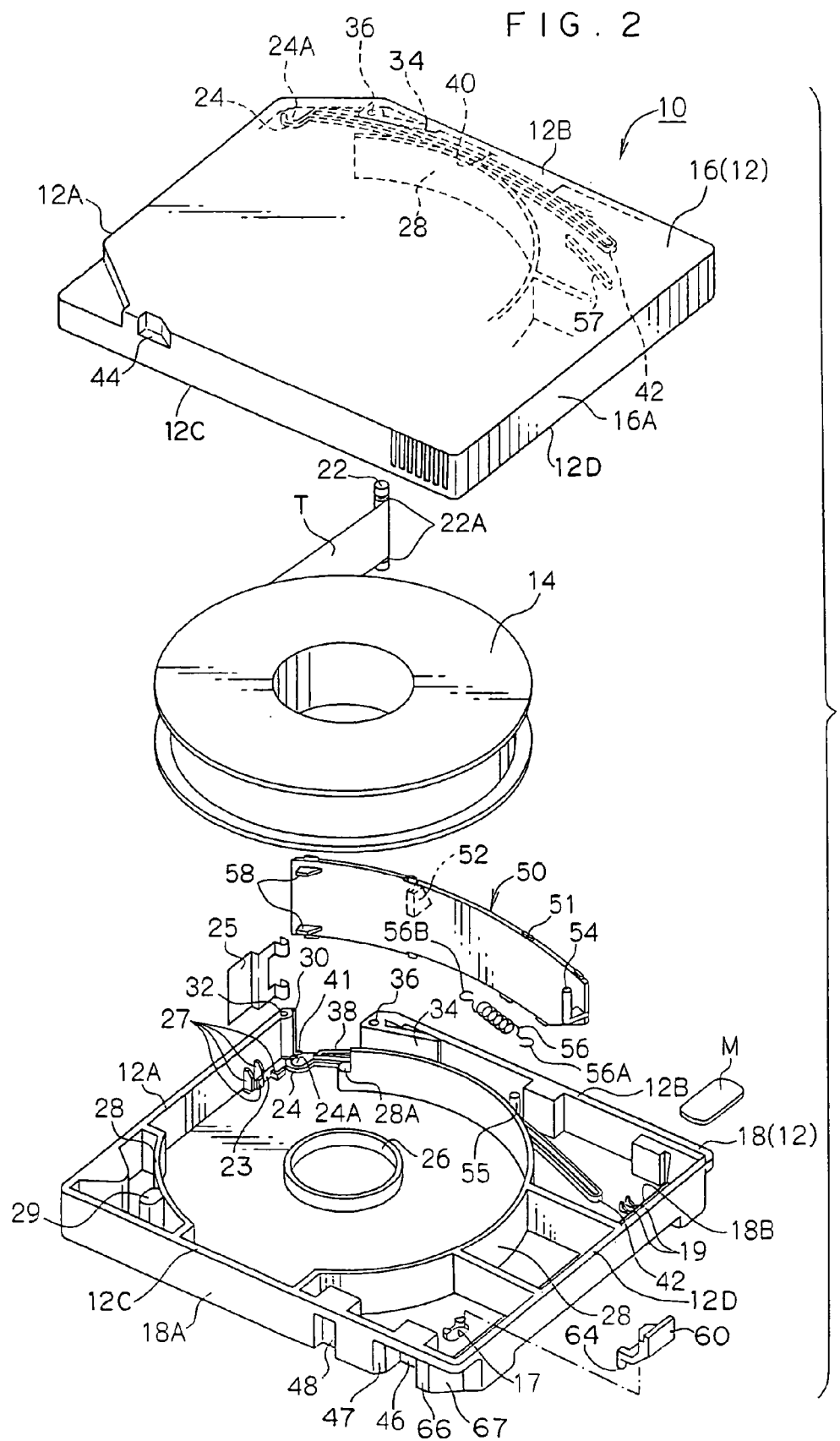
FIG. 2 is a schematic exploded perspective view of the recording tape cartridge.
Figure 3:
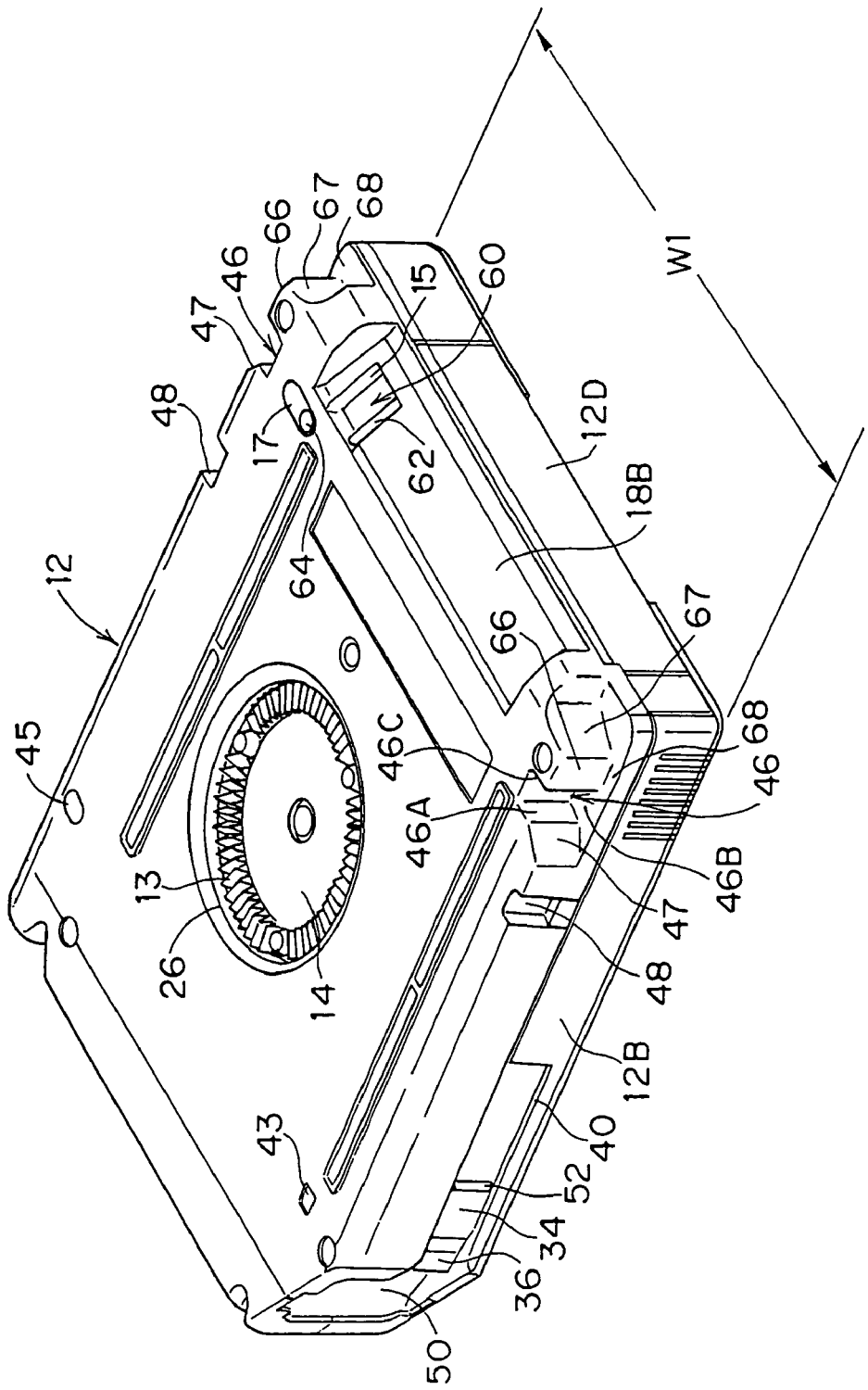
FIG. 3 is a schematic perspective view of the recording tape cartridge viewed from below.

As shown in FIGS. 1 through 3, the recording tape cartridge 10 is structured such that a single reel 14, on which is wound a magnetic tape T serving as a recording tape which is an information recording/playback medium, is rotatably accommodated within a case 12 which is made of synthetic resin and substantially rectangular as seen in plan view. The case 12 is formed by peripheral walls 16A and 18A of an upper case 16 and a lower case 18 being set to oppose one another and being joined together. At each of the peripheral walls 16A, 18A, the front right corner portion, which is one corner portion at the leading side in the direction of loading the recording tape cartridge 10 into a drive device, is cut obliquely as seen in plan view. A space for accommodating the reel 14, on which the magnetic tape T is wound, is formed at the interior of the case 12.

The cut corner portions of the peripheral walls 16A, 18A form an opening 20 for the pulling-out of the magnetic tape T. A leader pin 22, which is pulled-out by a pull-out means of a drive device, is connected to the free end of the magnetic tape T which is pulled out from the opening 20. An annular groove 22A is formed in each of the end portions of the leader pin 22 which project out further than the transverse direction end portions of the magnetic tape T. Due to the annular grooves 22A being anchored by hooks or the like of the pull-out means, the hooks or the like do not contact and scratch the magnetic tape T at the time of pulling-out the magnetic tape T.

A pair of upper and lower pin holding portions 24, which position and hold the leader pin 22 at the interior of the case 12, are provided at the inner side of the opening 20 of the case 12. The pin holding portions 24 are formed in substantially semicylindrical shapes as seen in plan view, such that that magnetic tape T pull-out sides thereof are open. The end portions of the leader pin 22 which is in a state of standing upright can enter into and exit from the depressed portions 24A of the pin holding portions 24 from the open sides thereof.

In vicinities of the pin holding portions 24, a proximal portion 25A of the anchor spring 25 is inserted and fixed in spring holding portions 27 which are provided at the inner surface of the front wall 12A. The front wall 12A is the portions of the peripheral walls 16A, 18A where the outer surfaces face in the direction of arrow A. The distal ends (free ends) of the anchor spring 25, which have been divided so as to be forked in two, push the upper and lower ends of the leader pin 22 toward the inner sides of the pin holding portions 24, and thereby hold the leader pin 22 within the pin holding portions 24. When the leader pin 22 enters into and exits from the pin holding portions 24, the distal ends of the anchor spring 25 elastically deforms appropriately so as to permit movement of the leader pin 22.

A gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by movement restricting walls 28 which partially project out at the inner surfaces of the upper case 16 and the lower case 18, and which serve as inner walls which are on a circular locus which is coaxial with the gear opening 26.

An enclosure 28A, in which a hole for position regulation is formed, is continuous with the end portion of the movement restricting wall 28 in a vicinity of the opening 20. Further, an enclosure 28B, in which is formed a hole for position regulation which is a long hole, stands erect in the space sandwiched between the front left corner portion of the case 12 and the movement restricting wall 28. The enclosures 28A, 28B are disposed on a single straight line which extends along the direction of arrow B. End portions of the movement restricting walls 28, except for the end portion thereof at which the enclosure 28A is continuous, are continuous with the peripheral wall 16A or the peripheral wall 18A of the case 12, so as to partition the outer sides of the movement restricting walls 28 and the space at which the reel 14 is set.

A memory board M, which stores various types of information, is set at the rear right portion of the lower case 18 for each recording tape cartridge 10. A portion of a rear wall 18C forming the peripheral wall 18A is inclined at a predetermined angle and the memory board M is disposed so as to be inclined at a predetermined angle, such that sensing is possible at a drive device which reads from the bottom surface side and at a library device which reads from the rear surface side.

Further, a write-protect tab 60, which is set so that recording of information onto the recording tape cartridge 10 is possible or is not possible, is provided at the left rear portion of the lower case 18. An operation projection 62 for manually operating the write-protect tab 60 projects from an opening 15, which is provided at a rear wall 18B of the lower case 18. An oval opening 17 where a distinction projection 64 for showing whether the drive 90 is recordable or not is located is formed on the bottom surface of the lower case 18.

In addition, a pair of short upper and lower sloped wall portions 30 are provided in a right end portion of a front wall 12A of the accommodating case 12. The sloped wall portions 30 define a front peripheral portion of the opening 20. The sloped wall portions 30 are each formed bent along the opening face of the opening 20 to be thicker than the front wall 12A. The sloped wall portions 30 are dust-proof walls in order not leave a space for dusts when the opening 20 is closed and the end of a door 50 (described below) inwardly enters. A pair of upper and lower screw bosses 32 is integrally formed inside the front wall 12A in the vicinity on the left side of the sloped wall portion 30.

A pair of upper and lower sloped wall portions 34 are provided inside a front end portion of right wall 12B (portion of the peripheral walls 16A and 18A in the direction of the arrow B) of the accommodating case 12. Each of the sloped wall portions 34 is shaped substantially along an outer peripheral surface of the door 50 (described below) in plan view. Front end portions of the sloped wall portions 34 define a rear peripheral portion of the opening 20. A pair of upper and lower screw bosses 36 are provided in front end portions of the sloped wall portions 34.

At the right wall 12B of the accommodating case 12, a slit 40 with a certain length is provided to be used as a window for communication between the inside and the outside of the accommodating case 12. The slit 40 is used to expose an operation protrusion 52 of the door 50. The slit 40 is formed by cutting off a front lower portion of the peripheral wall 16A of the upper case 16 constituting the right wall 12B, and is thereby formed open also toward the opening 20. Thus, the outer surface of the screw boss 36 in the upper case 16 is exposed through the slit 40. The slit 40 is often formed to have a portion of the peripheral wall 16A in order to ensure the rigidity of the case 1. The upper wall which defines the slit 40 is often made integrally with the sloped wall portion 34.

The slit 40 described above may be formed such that an upper end thereof is defined only by a top plate of the accommodating case 12 (top plate of the upper case 16). The peripheral wall 16A may be partly remained to maintain the stiffness of the accommodating case 12, such as strength against an impact caused by dropping the case. In this case, the upper wall defining the slit 40 may be provided integral with the sloped wall portion 34.

Figure 4:
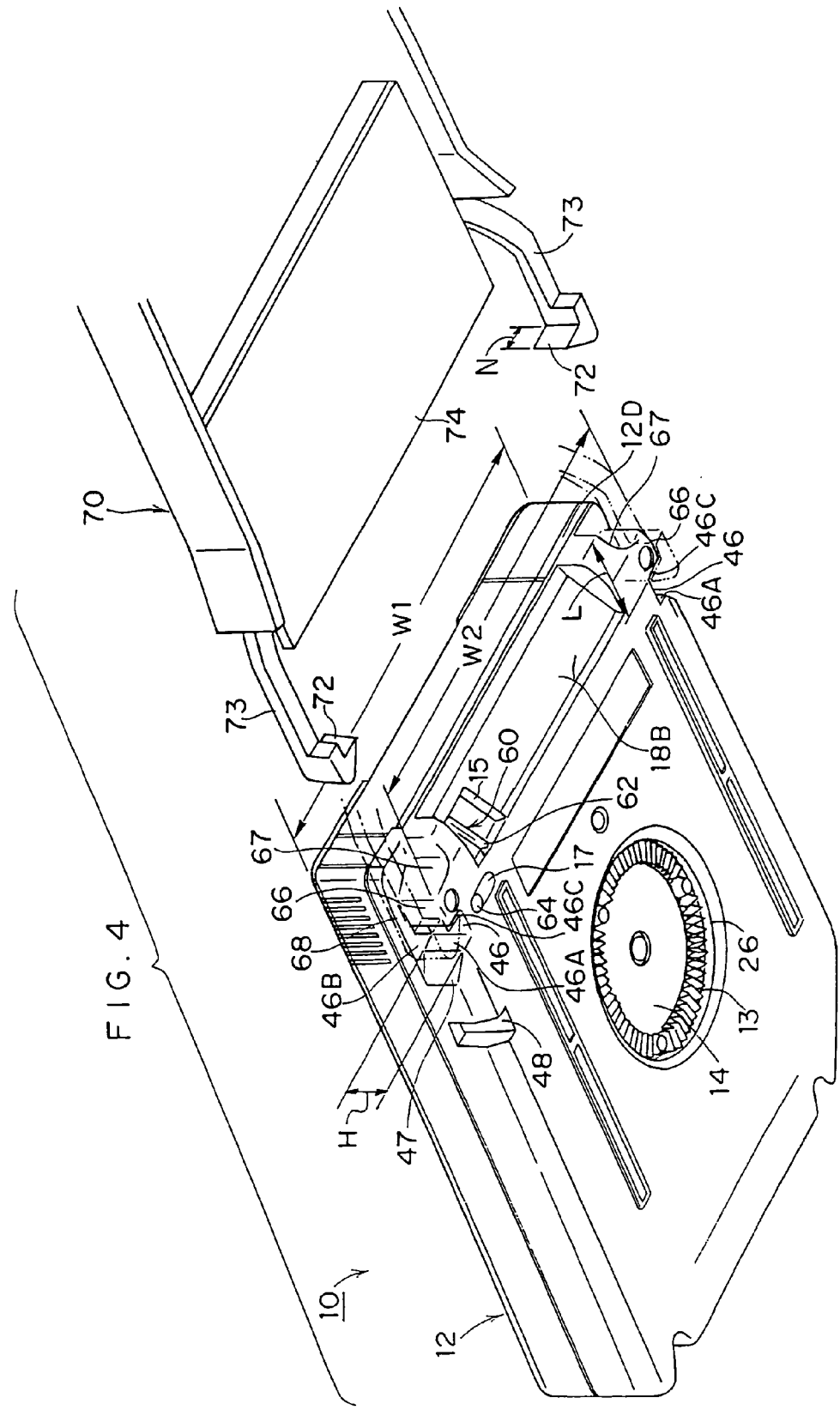
FIG. 4 is a schematic perspective view showing the recording tape cartridge and a robot hand.

A concave portion 48 (cut-off portion of the bottom plate) is formed further rearwardly from the concave portion 44 in the lower case 18 (refer to FIG. 4). The concave portion 48 is formed such that a portion excluding an upper end of the peripheral wall 18A is concave similarly to the form of the letter "U" inwardly of the accommodating case 12 and, in addition, is concave upwardly from the lower surface of the accommodating case 12. The concave portion 48 is formed on the left wall of the accommodating case 12. This concave portion 48 is used, for example, as an engagement portion with which a pull-in means of the drive device is engaged. In addition, for example, a bottom surface (downward surface) of the concave portion 48 is used as a reference surface for performing positioning in the drive device 90.

Further, a concave portion 46 (cut-off portion of the bottom plate) is formed on a rear portion of the concave portion 48. These concave portions 46 are grasped portions into which are inserted and which engage with the claw portions 72 (see FIG. 8) of the robot hand 70 (grasping device) which is disposed in a vicinity of the library 100 shown in FIG. 10, or are anchoring/holding portions or grasped portions into which are inserted and which engage with the pair of claw portions 117 (see FIG. 9) which are provided at the side walls 112B of the accommodating chamber 112 of the library 110 shown in FIG. 11. The concave portion 46 is used as an engagement portion with which a claw 72 (FIG. 8) of a robot hand 70 provided in the vicinity of the library 100 engages. Alternatively, the concave portion 46 is used as an engagement—retaining portion with which a pair of claws 117 (FIG. 9) located on side walls 112B of the chamber 112 of the library 110 shown in FIG. 11 engages.

With these concave portions 46 and 48, the torsion strength of the case 12 including the lower case 18 improves. A trapezoidal dented portion 44 is formed on the upper surface of the left wall 12C of the upper case 16. This dented portion 44 is used as an engagement portion where an unillustrated portion for canceling rotation moment due to the movement of the door 50 for opening.

In each of the upper and lower cases 16 and 18, a guide wall 42 with a certain height (for example, approximately in a range from 1.0 mm to 1.5 mm) is provided. The guide wall 42 extends from the vicinity of the opening 20 to the vicinity of a position at which the movement restricting walls 28 is proximate to the accommodating case 12 (the position hereinbelow will be referred to as the "first half"). The guide wall 42 extends to the vicinity of the rear wall either from the concave portion 44, which defines the rear end of the slit 40, or from the concave portion 44 (the position hereinbelow will referred to as the "second half"). The guide wall 42 described above supports a convex portion 51 of the door 50 (described below) in such a manner as to sandwich it from two sides of an inner surface and an outer surface thereof.

The guide walls 42 are formed substantially arc-shaped in plan view. The guide walls 42 in the upper and lower cases 16 and 18 are formed mutually different in length. Specifically, the second half of the guide wall 42 in the upper case 16 is formed longer than that in the lower case 18. This is because the memory board M is provided to be inclined at a certain angle at the right wall 12B of the lower case 18.

Further, the rear end portions of the guide wall portions 42 are closed in substantial arc-shapes as seen in plan view, and restrict the convex portions 51 which are furthest toward the rear at both the top and bottom of the door 50 such that the door 50 cannot move any further rearward. The front end portions of the guide wall portions 42 extend to positions which, when the leader pin 22 is entering and exiting, do not impede the entry or exit of the leader pin 22. Such positions are about half of the opening width and which are further rearward than pin holding portions 24 in this embodiment. The convex portions 51 which are furthest toward the front at both the top and bottom of the door 50 are restricted such that the door 50 is closed and cannot move any further forward.

In the vicinity of the inclined wall portions 30 as well, guide wall portions 41, whose rear end portions are open, stand erect so as to be positioned on imaginary lines extending from the guide wall portions 42. The rear end portions of the guide wall portions 41 do not extend further rearward than the front ends of the pin holding portions 24, so as to not impede entry and exit of the leader pin 22. The interval (groove width) of the guide wall portion 41 is slightly narrower than the interval (groove width) of the guide wall portion 42.

Namely, the interval (groove width) of the guide wall portion 42 is formed to be slightly wider in order to permit dispersion in molding of the door 50 (dispersion in the curvature of the door 50). The convex portions 51 of the door 50 slide within the guide wall portions 42 in a state in which the convex portions 51 joggle to a certain extent. Accordingly, the interval (groove width) of the guide wall portion 41 is made to be substantially the same size as the width of the convex portion 51 of the door 50 (the width including projections which will be described later). When the opening 20 is closed, due to the front most convex portions 51 entering in the guide wall portions 41, the door 50 can be held without joggling.

The first half of the guide wall 42 is formed somewhat lower than the second half of the guide wall 42. The first half of the guide wall 42 is formed to a height of around 1 mm, whereas the second half of the guide wall 42 is formed to a height of around 1.5 mm. The guide wall 42 is thus formed to secure spacing of the opening 20 to be sufficient to allow entrance of the pull-out means of the drive device that chucks the leader pin 22 to pull it out. For this reason, as described below, the door 50 in the first-half portion (at least a portion for blocking the opening 20) has a plate width (height) larger (higher) than the smaller height of the guide wall 42.

On an inner surface of each of the upper and lower cases 16 and 18, a rib 38 is formed integral with the outer guide wall 42 exposed to the outside through the opening 20 to have a substantially trapezoidal shape in plan view. The rib 38 is formed to a height equal to the height of the aforementioned guide wall 42. The rib 38 works to secure the strength of each of the upper and lower cases 16 and 18 in the portion of the opening 20. The inner guide wall 42 is integrally formed with the pin holder 24. The pin holder 24 may be formed to a height substantially equal to or higher than the height of the integrally formed guide wall 42.

As described above, the upper case 16 and the lower case 18 are fixed (coupled) with unillustrated screws inserted from the underside into the screw bosses 32 and 36 positioned in the vicinity of the opening 20. The corner portions at two ends of the opening 20 are insufficient in strength and tend to collide with the ground in an event the accommodating case 12 is dropped. In the structure described above, the corner portions are defined by individual free ends of the sloped wall portion 30 (front wall 12A) and the sloped wall portions 34 (right wall 12B) and are strongly coupled. Thus, even when dropped, the accommodating case 12 is neither deformed nor buckled due to the weight of the overall recording tape cartridge 10. A portion where the peripheral walls 16A and 16B are joined at both corners of the opening 20 may be welded for fixing. For taking parts apart and recycling, the portion may be screwed for fixing.

The opening 20 is opened and closed by the door 50 which serves as a closing member. The plate width (height) of at least the portion of the door 50 for closing the opening 20 is substantially the same as the opening height of the opening 20 as shown in FIG. 2. The plate length of this portion is formed to be sufficiently larger than the opening width of the opening 20. Further, the door 50 is formed in a substantial arc-shape in plan view which is curved in the direction of the plate thickness, so that the door 50 can move along a predetermined circumference.

Figure 7A:
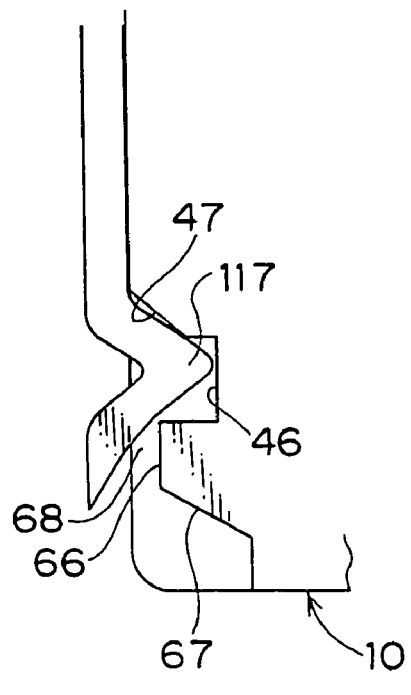
FIGS. 7A and 7B are schematic explanatory diagrams showing the process of the anchor device of the library coming out from the grasped portions of the recording tape cartridge.

The door 50 closes the opening 20 in a state in which the distal end portion of the door 50 has entered into the concave portions 30A of the inclined wall portions 30 (FIG. 7A). When the door 50 slides (rotates) substantially rearwardly along the aforementioned predetermined circumference so as to open the opening 20 (FIG. 7B), and the outer peripheral surface in the vicinity of the distal end of the door 50 reaches a vicinity of the screw bosses 36, the opening 20 is completely opened (FIG. 7C). Further, the door 50 closes the opening 20 by sliding (rotating) in the direction opposite to the direction at the time of opening the opening 20.

As described above, the door 50 is arc-shaped corresponding to the circumference predetermined as a movement locus thereof. In the present embodiment, a center of the rotational movement (pivot center) is determined such that the position in the left-right direction is set to the vicinity of the left end of the accommodating case 12, and the position in the front-rear direction is set to the vicinity of the rear end of the slit 40. Thereby, the movement locus of the door 50 becomes proximate to the right wall 12B of the accommodating case 12 in the vicinity of the slit 40. The rotation center and radius of the door 50 may appropriately be determined according to, for example, the positions of front and rear end portions (such as the sloped wall portion 30 and the screw boss 36) of the opening 20 and the opening-face angle of the opening 20. The positions of the front and rear end portions are determined according to requirements of the drive device, and the opening-face angle is determined according to requirements of the library device.

The plate length of the door 50 or the curved longitudinal dimension thereof is determined such that, in the state in which the door 50 closes the opening 20, the rear end portion of the driving portion 50B is positioned in the right rear corner portion of the case 12. Note that the bottom rear portion of the driving portion 50B is cut obliquely in order to avoid the memory board M which is disposed obliquely at the rear wall 18C.

A plurality of convex portions 51, which enter into the upper and lower guide grooves 42, project at the upper and lower ends of the door 50. The convex portions 51 abut guide surfaces (mutually opposing inner surfaces) of the guide walls 42 and an inner surface of the upper case 16 and an inner surface of the lower case 18 between the guide walls 42 to thereby guide the door 50 along the opening/closing direction. The convex portions 51 are each formed substantially elliptical (in plan view) along the lengthwise direction of the door 50, and four pieces thereof protrude on each of the upper and lower surfaces of the door 50 to be vertically symmetric except for the rearmost the convex portions 51. For example, the convex portions 51 in front of a border of two different widths of the door 50 are about 0.5 mm, and the rest of the convex portions 51 behind the border are about 1.5 mm. The rearmost convex portions 51 are provided asymmetric for the reason that the rear-lower portion of the door 50 is diagonally cut off.

The above arrangement enables reduction in the sliding resistance (friction) among the individual upper and lower convex portions 51, the individual inner surfaces of the upper and lower cases 16 and 18, and the individual guide surfaces of the guide walls 42. Consequently, the door 50 can be caused to slide smoothly. Meanwhile, the convex portion 51 formed substantially elliptical in plan view is superior in impact resistance to a convex portion 51 formed substantially circular in plan view. Hence, even when a force is imposed on the door 50 from a direction other than the opening/closing direction, the convex portion 51 will not be broken thereby.

As an operation portion, the operation protrusion 52 is formed along the radial direction of the door 50 on the outer peripheral surface in a portion located slightly forward from a longitudinal central portion of the door 50 in the vicinity of the boundary portion where the plate width of the door 50 is different. The operation protrusion 52 is exposed to the outside of the accommodating case 12 through the slit 40. In the closed state of the opening 20, the operation protrusion 52 is positioned in a portion slightly spaced away from the rear end of the screw boss 36, and can be operated through a portion opened forward in the slit 40. In the opened state of the opening 20, the operation protrusion 52 is positioned in a portion slightly spaced away from the rear end of the slit 40. The rearmost convex portion 51 abuts the rear end portion of the guide wall 42.

Stoppers 58, which abut the upper end portion side surface and the lower end portion side surface of the leader pin 22 when the opening 20 is closed, project at the inner surface of the front end portion of the door 50. The stoppers 58 can even more reliably prevent the leader pin 22 from falling out from the pin holding portions 24 due to impact if the recording tape cartridge 10 is dropped or the like. The coil spring 56, which serves as an urging member which urges the door 50 in the direction of closing the opening 20, is of a length such that it extends to the rear right corner portion of the case 12 in the state in which the door 50 closes the opening 20. Thus, as shown in FIG. 6, the space between the movement restricting wall 28 and the right wall 12B (the peripheral walls 16A, 18A) at this rear right corner portion can be utilized effectively.

Namely, a spring holding portion 54, which is substantially L shaped in rear view, projects upwardly and integrally at the inner peripheral surface of the door 50 in a vicinity of the rear end thereof. A solid cylindrical spring anchor portion 55 projects upwardly at the inner surface of the lower case 18 in a vicinity of the concave portion 48. Ring-shaped attachment portions 56A, 56B are formed at the ends of the coil spring 56. Accordingly, the coil spring 56 can be easily attached within the aforementioned space due to the one attachment portion 56B thereof being placed on the spring anchor portion 55 from above such that the spring anchor portion 55 is inserted therethrough, and the other attachment portion 56A thereof being placed on the spring holding portion 54 from above such that the spring holding portion 54 is inserted therethrough.

A rib 57, along which the top portion of the holding projection 54 slides at the time the door 50 is being opened and closed, stands erect in a substantial arc-shape in plan view at the upper case 16. The rib 57 is disposed at a position and has a length such that the distal end (top end) of the holding projection 54 can slide within the rib 57 at least when the door 50 starts to move (open). Due to the rib 57 suitably guiding the holding projection 54 which moves against the urging force of the coil spring 56, the door 50 can be opened more stably (the door 50 does not shake due to the urging force of the coil spring 56 at the time of opening).

Here, the concave portions 46, which are used as grasped portions or anchoring/holding portions, will be described in further detail on the basis of FIGS. 4 through 7. For convenience of explanation, at the outer configuration of the recording tape cartridge 10 shown in FIGS. 1 and 3, in particular, a left-right direction width W1 thereof is slightly larger than the width V of the recording tape cartridge 108 shown in FIG. 8 (W1 >V), and is equal to the width U of the recording tape cartridge 118 shown in FIG. 9 (W1=U).

Figure 8:
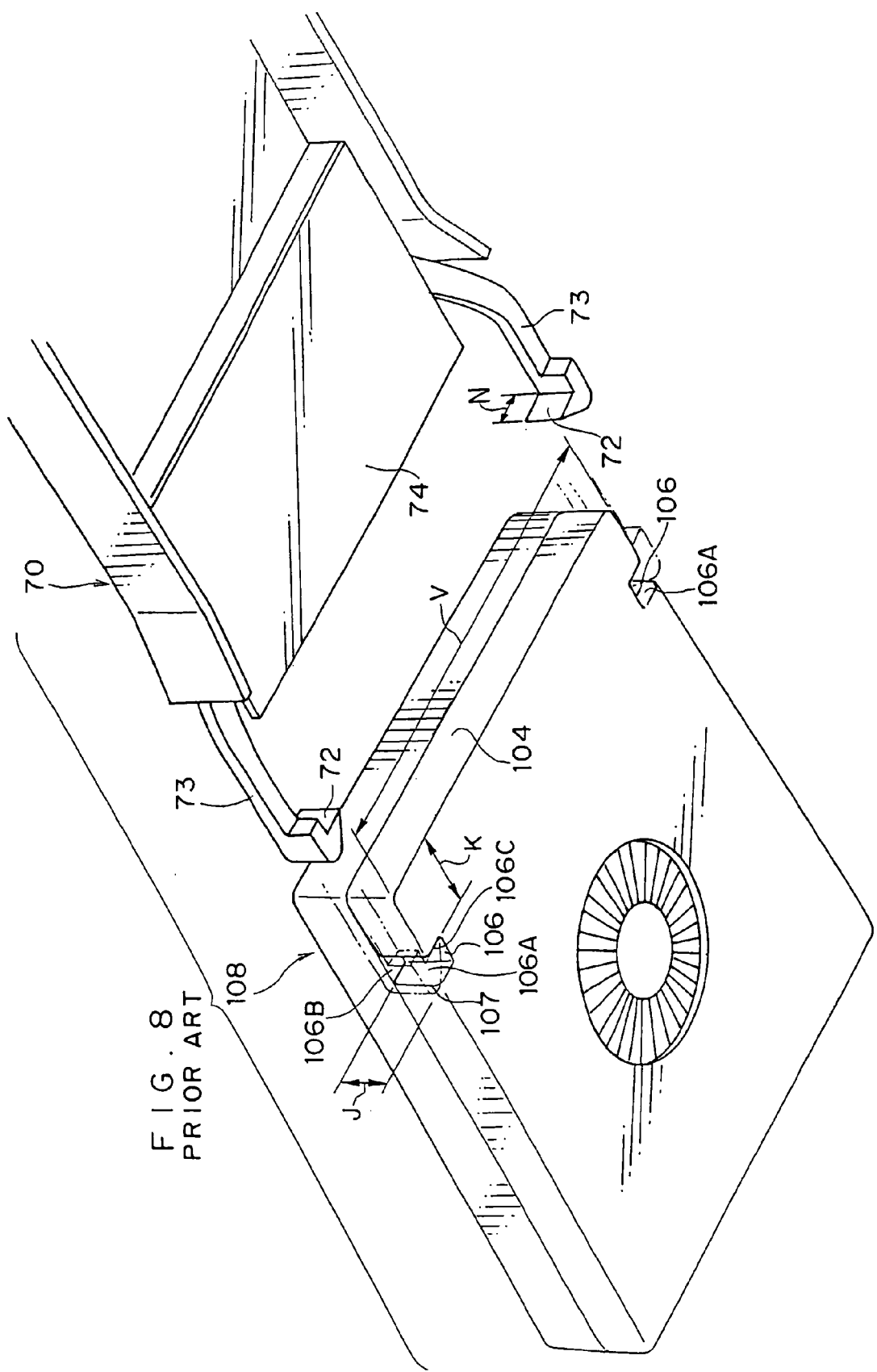
FIG. 8 is a schematic perspective view showing a recording tape cartridge, which is a standard, and a robot hand.

The interval between the claw portions 72 of the robot hand 70 is set such that the recording tape cartridge 108 shown in FIG. 8 can be grasped from the left and the right. The interval between the claw portions 82, 84 of the robot hand 80 is set such that the recording tape cartridge 118 shown in FIG. 9 can be grasped from above and below. Moreover, the distance (interval) from a floor surface 102A, 112A of the accommodating chamber 102, 112 to the bottom surface of the recording tape cartridge 108, 118 at the time when the recording tape cartridge 108, 118 is accommodated in the accommodating chamber 102, 112 of the library 100, 110, is not considered.

Figure 10:
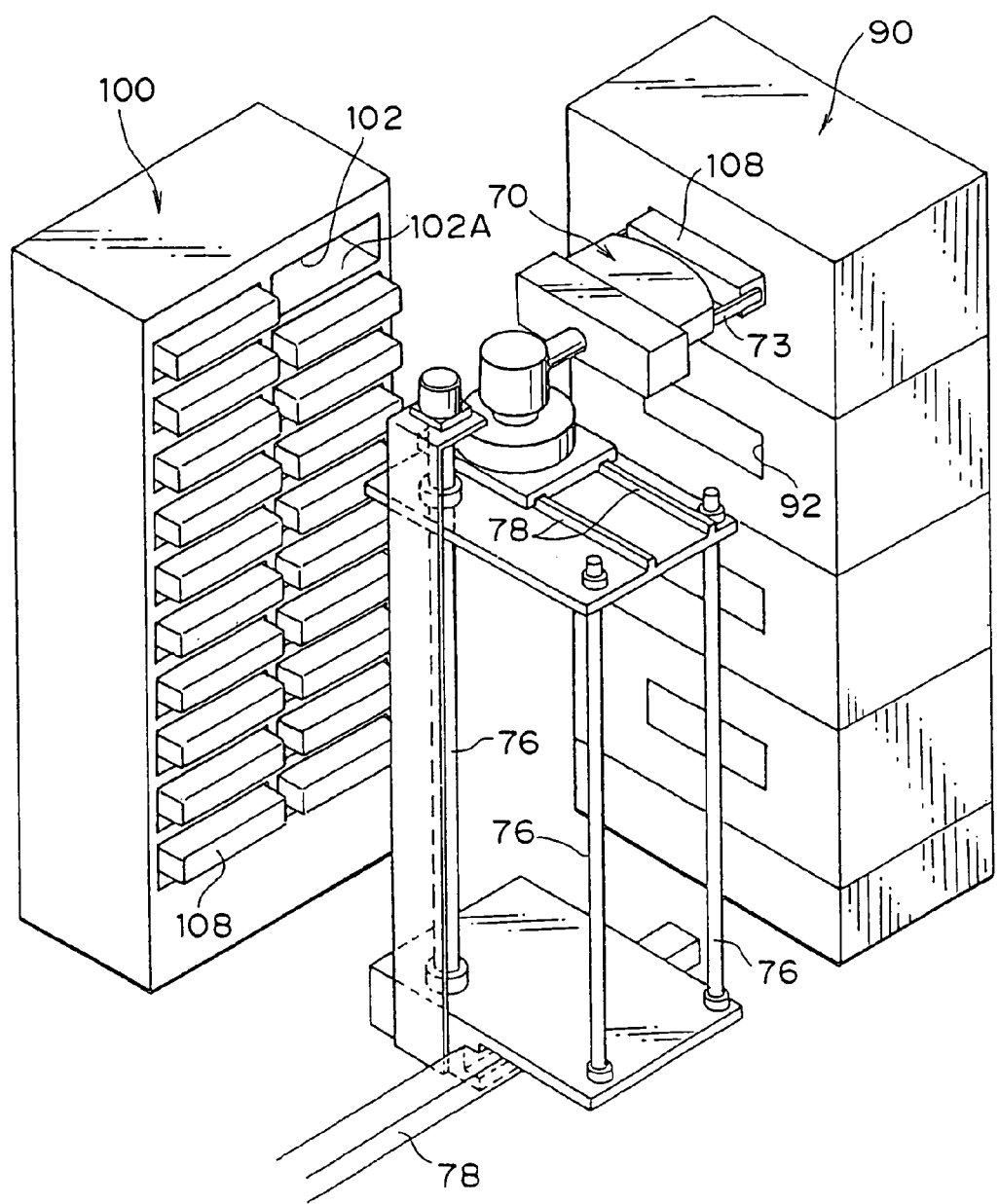
FIG. 10 is a schematic perspective view showing a library and drive devices.

First, the case of the library 100 shown in FIG. 10 will be explained. As shown in FIG. 8, when the robot hand 70 grasps the recording tape cartridge 108 accommodated in the accommodating chamber 102, the claw portions 72 are inserted into the concave portions 106. At this time, a height J from the floor surface 102A of the accommodating chamber 102 in which the recording tape cartridge 108 is accommodated to a ceiling surface 106B of the concave portion 106, and a length K from the rear wall 104 to a rear surface 106C of the concave portion 106, are stored as data in a control device (not illustrated) of the robot hand 70, and the interval between the claw portions 72 is set so as to correspond to the width V. Thus, the robot hand 70 can correctly grasp the recording tape cartridge 108.

Namely, the robot hand 70 is controlled in accordance with the aforementioned respective data, and grasps the recording tape cartridge 108. Accordingly, for recording tape cartridges 10 having different outer configurations (sizes), it suffices for the concave portions 46 (grasped portions) which the robot hand 70 grasps to be disposed at the same dimensional positions as the concave portions 106 of the recording tape cartridge 108 shown in FIG. 8.

Namely, as shown in FIG. 4, it suffices for a height H from the floor surface 102A of the accommodating chamber 102 in which the recording tape cartridge 10 is accommodated to a ceiling surface 46B of the concave portion 46, and a length L from the rear wall 12D of the case 12 to a rear surface 46C of the concave portion 46, and an interval (width) W2 between side walls 66 (corner portions) continuous from the rear surfaces 46C of the concave portions 46 (W2<W1) to be formed to the same dimensions (H=J, L=K, W2=V) as in the case of the concave portions 106 of the recording tape cartridge 108. With such a structure, the robot hand 70 can accurately grasp even the recording tape cartridges 10 at which the outer shapes (and the widths in particular) of the case 12 are different.

As a result of molding to these same dimensions, at the recording tape cartridge 10, overhang portions 68 are formed above the side walls 66. When such overhang portions 68 exist, arms 73 of the claw portions 72 can support the overhang portions 68 from beneath. Thus, the recording tape cartridge 10 can be supported more reliably than in a case in which it is supported only by the supporting portion 74. Accordingly, errors, such as the recording tape cartridge 10 being dropped from the robot hand 70 or the like, do not occur. Further, because the overhang portions 68 can be used as a reference surface in the heightwise direction, the accuracy of positioning the recording tape cartridge 10 with respect to the library 100 or the drive device 90 can be improved.

In addition, inclined walls 67, which are formed at a predetermined angle in bottom view, are formed at the rear sides continuing from the side walls 66. The inclined walls 67 serve as guide surfaces for guiding the claw portions 72 to the concave portions 46 when the positions of the claw portions 72 of the robot hand 70 are slightly offset in the left-right direction. However, depending on the structure of the claw portions 72, it is possible to not form these inclined walls 67.

Figure 9:
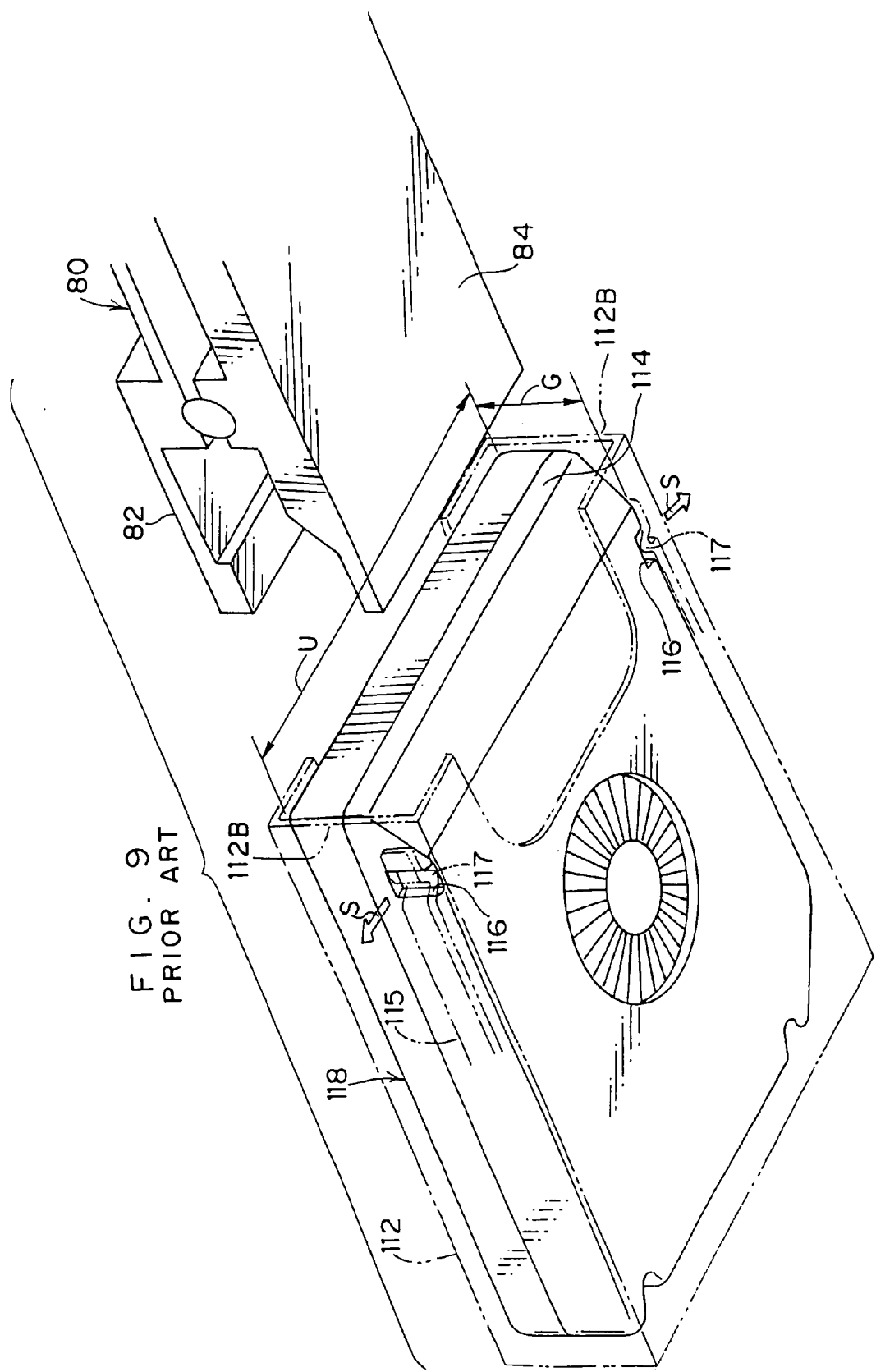
FIG. 9 is a schematic perspective view showing a recording tape cartridge, which is a standard, and another robot hand.
Figure 11:
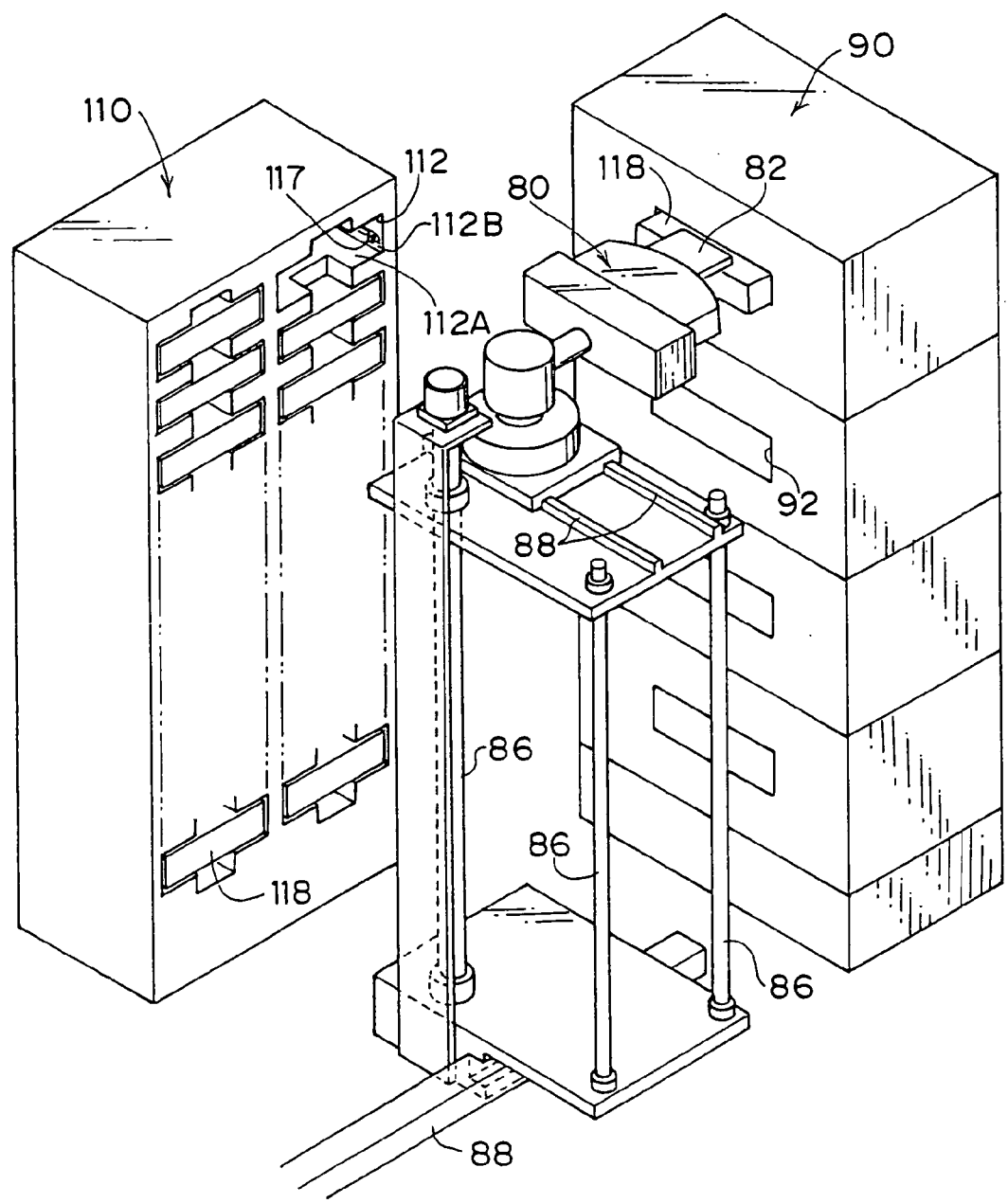
FIG. 11 is a schematic perspective view showing another library and drive devices.

Next, the case of the library 110 shown in FIG. 11 will be described. As shown in FIG. 9, when the robot hand 80 grasps the recording tape cartridge 118 accommodated in the accommodating chamber 112, the claw portions 82, 84 grasp (nip) the top surface and the bottom surface at the rear wall 114 side from the vertical directions.

Accordingly, it suffices for a height G at the rear wall 114 side of the recording tape cartridge 118 to be stored as data in a control device (not illustrated) of the robot hand 80. The interval between the claw portions 82, 84 is set in advance so as to coincide with the height G. Thus, the robot hand 80 can accurately grasp the recording tape cartridge 118. Accordingly, for the recording tape cartridges 10 having different outer shapes, the recording tape cartridges 10 can be grasped correctly if a height F of the rear wall 12D side which the robot hand 80 grasps is formed to be the same dimension as the height G of the rear wall 114 side of the recording tape cartridge 118 shown in FIG. 9 (i.e., if F=G).

Moreover, the accommodating chamber 112 of the library 110 is molded of a synthetic resin. The pair of claw portions 117, which are molded so as to be bent so as to project by a predetermined length toward the inner side, are provided at predetermined places of the side walls 112B of the accommodating chamber 112 (see FIG. 6). The claw portions 117 can be elastically deformed in the left-right direction by entering into cut-outs 115 formed in the side walls 112B, and are always in a state of being urged toward the inner side. Accordingly, even if the recording tape cartridge 118 accommodated in the accommodating chamber 112 joggles slightly (i.e., there is a slight interval between the accommodating chamber 112 and the recording tape cartridge 118 accommodated therein), the claw portions 117 are reliably inserted in the concave portions 116, and the recording tape cartridge 118 is thereby anchored and held in the accommodating chamber 112.

When the recording tape cartridge 118 is to be removed from the accommodating chamber 112, the robot hand 80 pulls the recording tape cartridge 118 out rearward by a predetermined force. At this time, accompanying this pulling-out operation, the claw portions 117 provided at the accommodating chamber 112 elastically deform (flex) appropriately toward the outer sides (in the directions of the illustrated arrows S) and come out from the concave portions 116 so as to permit movement of the recording tape cartridge 118. Accordingly, the concave portions 116 are formed to be more shallow than the projecting lengths of the claw portions 117 in order for the claw portions 117 to easily come out therefrom.

Figure 7B:
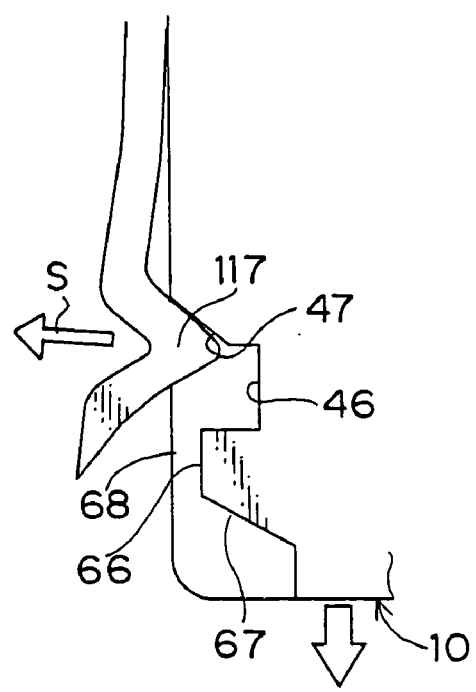

As shown in FIG. 6, in the case of the recording tape cartridge 10, the concave portions 46 which the claw portions 117 engage are grasped portions into which the claw portions 72 of the robot hand 70 are inserted and which are grasped by the claw portions 72. Therefore, the concave portions 46 are formed to be substantially the same as or slightly deeper than a length (width) N of the claw portions 72. Accordingly, when the recording tape cartridge 10 is accommodated in the accommodating chamber 112 of the library 110, the claw portions 117 are inserted deeply in the concave portions 46 by an amount corresponding to the projecting lengths of the claw portions 117. However, corner portions of the concave portions 46 at a front surface 46A side, which is the accommodating side of the library 110, are chamfered over a predetermined length (which is greater than or equal to C1, and may be C3 to C4), so as to form inclined walls 47 which are inclined at a predetermined angle in plan view (e.g., 45° with respect to the right wall 12B and the left wall 12C). Thus, as shown in FIGS. 7A and 7B, accompanying the removal of the recording tape cartridge 10 from the accommodating chamber 112, the claw portions 117 are elastically deformed (flexed) appropriately toward the outer sides (in the directions of the illustrated arrows S) while being suitably guided by the wall surfaces of the inclined walls 47, and smoothly come out from the concave portions 46. Accordingly, the recording tape cartridge 10 is smoothly removed from the accommodating chamber 112, and there is no fear that the claw portions 117 will be damaged. Herein, the "accommodating side of the library" refers to the deeper side of the library, i.e., the side of the library opposite the side thereof at which the loading opening is provided.

Next, operation of the above-described grasping portion structure of the recording tape cartridge 10 will be described. First, the library 100 will be described. As shown in FIG. 4, the recording tape cartridge 10 is removed from the accommodating chamber 102 by the robot hand 70. At this time, the robot hand 70 is set so as to coincide with the respective dimensions (J, K, V) of the recording tape cartridge 108. However, because the recording tape cartridge 10 has the same dimensions as these dimensions (H=J, L=K, W2=V), the recording tape cartridge 10 can be grasped accurately.

Namely, the claw portions 72 can be smoothly inserted into the concave portions 46, and the supporting portion 74 can reliably support the bottom surface of the case 12. Note that, at this time, because the overhang portions 68 are formed at the rear sides of the concave portions 46, the arms 73 of the claw portions 72 can support the recording tape cartridge 10 from beneath. Accordingly, the recording tape cartridge 10 can be supported more reliably than in a case in which it is supported only by the supporting portion 74, and errors, such as the recording tape cartridge 10 being dropped from the robot hand 70, do not occur. The recording tape cartridge 10 which is removed from the library 100 in this way is conveyed as is by the robot hand 70 to the drive device 90.

Figure 5:
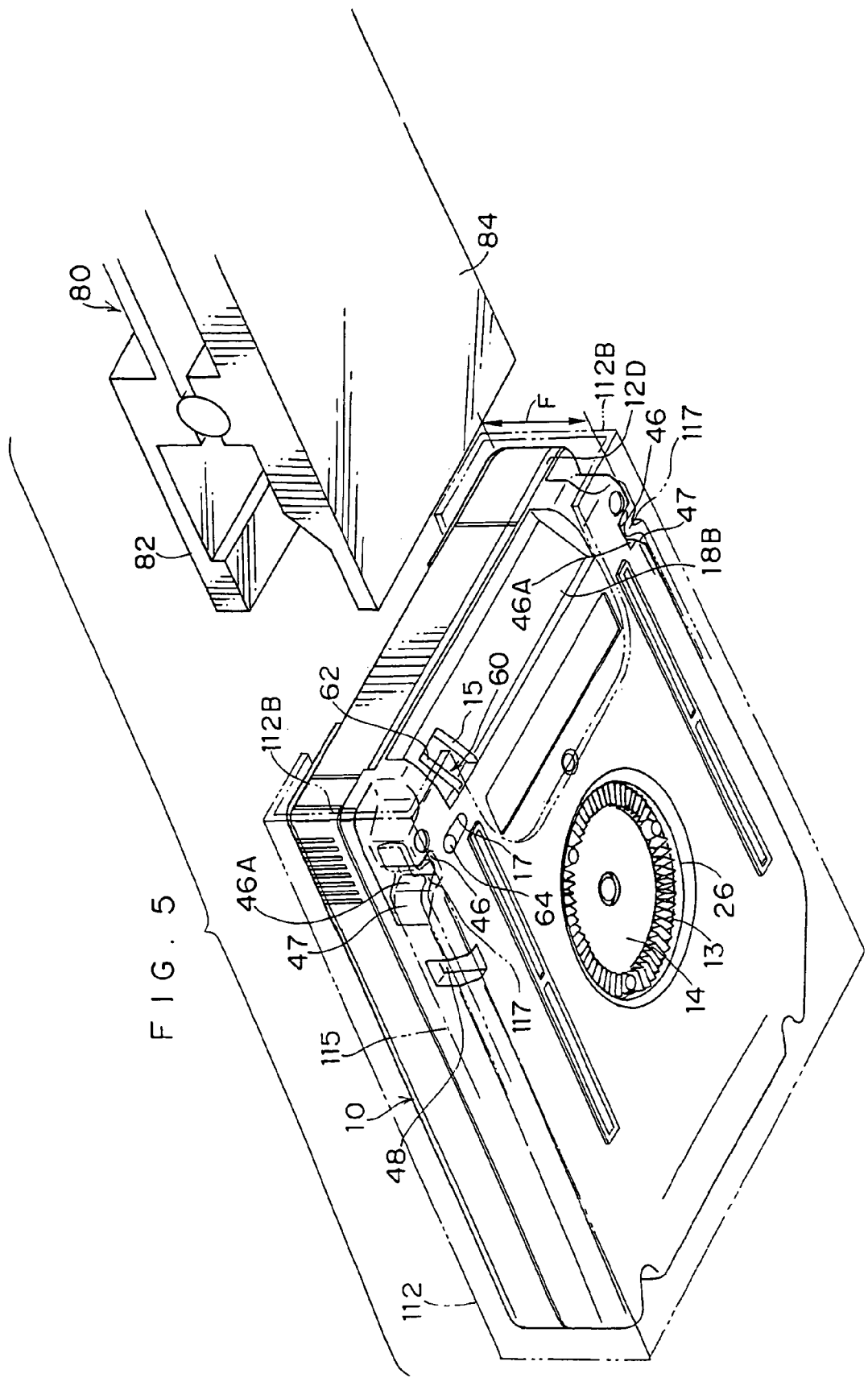
FIG. 5 is a schematic perspective view showing the recording tape cartridge and another robot hand.

Next, the library 110 will be described. As shown in FIG. 5, the recording tape cartridge 10 is removed from the accommodating chamber 112 by the robot hand 80. At this time, the height F at the rear wall 12D side of the recording tape cartridge 10 is the same as the height G at the rear wall 114 side of the recording tape cartridge 118 (F=G). Therefore, the claw portions 82, 84 of the robot hand 80 can reliably grasp (nip) the top and bottom surfaces at the rear wall 12D side of the recording tape cartridge 10.

Further, the recording tape cartridge 10 is anchored and held due to the claw portions 117, which are provided at the accommodating chamber 112, being inserted in the concave portions 46. Due to the rearward withdrawing movement of the robot hand 80, the claw portions 117 elastically deform (flex) outwardly toward the left and right (in the directions of arrows S shown in FIGS. 7 and 9), and come out from the concave portions 46. At this time, the corner portions of the concave portions 46 at the front surface 46A side, which is the library accommodating side of the corner portions 46, are chamfered, and the inclined walls 47 of predetermined angles are formed. Therefore, accompanying the operation of removing the recording tape cartridge 10, the claw portions 117 smoothly come out from the concave portions 46 while being suitably guided by the wall surfaces of the inclined walls 47. Accordingly, problems such as the claw portions 117 being damaged do not occur. The recording tape cartridge 10, which is removed from the library 110 in this way, is conveyed as is to the drive device 90 by the robot hand 80.

The recording tape cartridge 10, which has been conveyed to the drive device 90, is inserted into the loading opening 92. An engaging projection (not illustrated), which serves as an opening/closing member and is provided within the drive device 90, enters into the slit 40 which opens toward the front, and engages with the operation projection 52 of the door 50. In this state, when the recording tape cartridge 10 (the case 12) is pushed in further, due to this pushing-in force, the engaging projection moves the operation projection 52 rearward (moves the operation projection 52 rearward relative to the case 12 which is loaded in the direction of arrow A) against the urging force of the coil spring 56.

Thus, the door 50, from which the operation projection 52 projects, rotates clockwise as seen in plan view along the direction of curving thereof. Namely, the door 50 moves substantially rearward so as to circle around the outer sides of the pin holding portions 24 and the reel 14 without jutting out from the locus of movement along the curved configuration of the door 50, and opens the opening 20. Then, when the case 12 (the recording tape cartridge 10) is loaded to a predetermined depth in the drive device, the opening 20 is completely opened.

When the recording tape cartridge 10 is positioned within the drive device in this state, further rotation (substantially rearward movement) of the door 50 is restricted. A pull-out device of the drive device 90 enters into the case 12 from the opening 20 which has been opened. The pull-out device pulls-out the leader pin 22 which is positioned and held at the pin holding portions 24, and accommodates the leader pin 22 at an unillustrated take-up reel. Due to the take-up reel and the reel 14 being driven to rotate synchronously, the magnetic tape T is successively pulled-out from the case 12 while being taken-up onto the take-up reel. Information is recorded or played back by a recording/playback head or the like disposed along the predetermined tape path.

When the magnetic tape T is rewound onto the reel 14 and the recording tape cartridge 10 is to be ejected from the drive device 90, the positioned state of the recording tape cartridge 10 is released, and the recording tape cartridge 10 is moved in the direction opposite to the direction of arrow A by the urging force of the coil spring 56 or by an unillustrated ejecting mechanism. Then, the door 50 is rotated in the direction of closing the opening 20 by the urging force of the coil spring 56. Due to the distal end portion of the door 50 entering in at the inner sides of the inclined wall portions 30, the opening 20 is completely closed and returned to its initial state.

When the recording tape cartridge 10 is ejected from the drive device 90 in this way, the robot hand 70 or the robot hand 80 again approaches the recording tape cartridge 10. The claw portions 72 are inserted in the concave portions 46 and grasp the recording tape cartridge 10 from the both sides, or the top and bottom surfaces of the rear wall 12D side are grasped (nipped) by the claw portions 82, 84. Then, the recording tape cartridge 10 is conveyed to the predetermined accommodating chamber 102 or 112 of the library 100 or the library 110, and is accommodated in that accommodating chamber 102 or 112.

Note that, in the case of the accommodating chamber 112, the claw portions 117 provided thereat are elastically deformed (flexed) toward the left-right outer sides (in the directions of the illustrated arrows S) due to the operation of loading the recording tape cartridge 10, such that forward advancing movement of the recording tape cartridge 10 is permitted. Thereafter, the claw portions 117 engage with (are inserted in) the concave portions 46, and anchor and hold the recording tape cartridge 10 within the accommodating chamber 112. In this way, the recording tape cartridge 10 is again in a state of being stored in the library 100 or the library 110.

As described above, at the recording tape cartridges 10, 108 having different outer shapes (and different widths in particular), the dimensions of the positions at which the grasped portions (concave portions 46), which are grasped by the robot hand 70, are disposed are made to be the same (made to be common). Therefore, the robot hand 70 can accurately grasp both of the recording tape cartridges 10, 108. Accordingly, there is no need to adjust the interval between the claw portions 72 at the robot hand 70. Therefore, it suffices for the robot hand 70 to be a simple, inexpensive structure at which the interval between the claw portions 72 cannot be adjusted, and the time required for operation can be shortened. Moreover, because there is no need to provide separate libraries for the recording tape cartridges 10 and the recording tape cartridges 108, the costs and space which would otherwise be required for an additional library device can be reduced.

In addition, because the library accommodating side corner portions of the grasped portions (the concave portions 46) are chamfered (i.e., the inclined walls 47 are formed at the front surface 46A sides of the concave portions 46), the recording tape cartridge 10 can be accommodated even in the library 110 which has, at the accommodating chamber 112, the claw portions 117 which engage with (are inserted in) the concave portions 46. Namely, even if the claw portions 117 are inserted deeply into the concave portions 46 for the claw portions 72, because the claw portions 117 come out smoothly from the concave portions 46 owing to the inclined walls 47, removal (pulling-out) of the recording tape cartridge 10 can be carried out suitably.

Accordingly, the application (adaptability) of the recording tape cartridge 10 to the different types of libraries 100, 110 can be improved. Therefore, there is no need for a user who has, for example, the library 110 to newly provide the library 100. Costs are thereby decreased, and the space required for placement is thereby decreased.

Still further, the case 12 (the upper case 16 and the lower case 18) is molded of, for example, a polycarbonate (PC) material. The door 50 and the write protect portion 60 are molded of a material having better wear resistance than and a lower coefficient of friction than the case 12 formed of a polycarbonate (PC) material, e.g., the door 50 and the write protect portion 60 are molded of polyoxymethylene (POM) resin. Accordingly, the color of the door 50 and the write protect portion 60 may be made to be different from the color of the case 12 (e.g., the case 12 can be black, and the door 50 and the write protect portion 60 can be blue, or the like). With such a structure, the design is improved. Further, there is the effect that, among the respective structural parts of the recording tape cartridge 10, the parts which are exposed to the exterior and can move can be visually recognized.

Moreover, in cartridges for cleaning which clean the recording/playback head of the drive device 90, conventionally, there are many cases in which the color of the case is made to be a different color than that of the regular recording tape cartridge 10 in order to distinguish cartridges for cleaning from the regular recording tape cartridges 10 (e.g., the cartridge for cleaning is made to be semi-transparent or the like). However, if the color of the case itself is changed, although the cartridge for cleaning can be easily differentiated, problems arise in that the molding conditions and quality control are difficult. Moreover, at a cartridge for cleaning, a closing member (not illustrated), which closes the open hole 15 from which the operation projection 62 of the write protect portion 60 is exposed, is provided instead of the write protect portion 60. However, if the color of this closing member is merely changed to a color (e.g., gray) which is different than that of the write protect portion 60, there is the problem that recognition at a glance is difficult. Thus, in the cartridge for cleaning as well, changing the color of the door may be performed to the same color (e.g., gray) as that of the closing member. In this way, if the color of at least two of the parts is changed, the recording tape cartridges 10 and the cartridges for cleaning can be distinguished from one another at a glance.

As described above, in accordance with the present invention, because the structure of grasped portions of recording tape cartridges is made to be common (is standardized), the grasping device provided at the library can be structured simply, and the applicability (adaptability) of the recording tape cartridges to different types of libraries can be improved. Accordingly, the overall time required for operation can be shortened, and costs and space can be reduced.

What is claimed is:

1. A combination of a structure for holding tape cartridges in a same library, a grasping device, and at least a first recording tape cartridge and a second recording tape cartridge, the combination comprising:

a plurality of accommodation chambers in said structure which are configured to accommodate both the first recording tape cartridge and the second recording tape cartridge separately, the first recording tape cartridge being structurally different than the second recording tape cartridge, the grasping device being disposed in proximity to the structure for holding the tape cartridges so as to grasp the tape cartridges, the first recording tape cartridge and the second tape cartridge each comprise, a case rotatably accommodating a reel around which a recording tape is wound; and grasped portions which include concave portions provided at side walls of the case, and which the grasping device grasps from both sides, wherein a height from a floor surface of the accommodating chamber to the grasped portions of the first recording tape cartridge at a time when the first recording tape cartridge is accommodated in the accommodating chamber is the same as a height from the floor surface of the accommodating chamber to grasped portions of the second recording tape cartridge when the second recording tape cartridge is separately accommodated in the same accommodating chamber, and an interval between corner portions of the grasped portions of the first recording tape cartridge is the same as an interval between corner portions of the grasped portions of the second recording tape cartridge, and corner portions of the grasped portions of the first recording tape cartridge at an accommodating side of the library are chamfered, and wherein portions of the side walls of the case of the first recording tape cartridge extend from the concave portions of the first recording tape cartridge, and the case of the first recording tape cartridge has overhang portions which hang over further outwardly than the portions of the side walls that extend from the concave portions of the first recording tape cartridge, and which can be supported from beneath by the grasping device.

2. The structure of claim 1, wherein the chamfered corner portions of the grasped portions of the first recording tape cartridge are inclined walls which are inclined at a predetermined angle.

3. The structure of claim 1, wherein the overhang portions are reference surfaces, in a heightwise direction, for positioning of the first recording tape cartridge.

4. The structure of claim 1, wherein the first recording tape cartridge further comprises inclined walls at rear sides continuous from the side walls.

5. The structure of claim 4, wherein the inclined walls are guide surfaces which are operable to guide the grasping device to the concave portions of the grasped portions of the first recording tape cartridge.

6. The structure of claim 1, wherein the concave portions of the grasped portions of the first recording tape cartridge can be grasped by claws of the grasping device and a depth of the concave portions of the first recording tape cartridge is formed to be one of substantially the same as or slightly deeper than a length of the claw portions.

7. A method of manufacturing a combination of at least a first recording tape cartridge and a second recording tape cartridge, a grasping device and a structure which holds the at least first recording tape cartridge and the second recording tape cartridge in a same library, the method comprising:

forming a plurality of accommodation chambers which are configured to respectively accommodate both the first recording tape cartridge and the second recording tape cartridge separately, providing the grasping device in proximity to the structure for holding the tape cartridges, so that the grasping device grasps the tape cartridges, forming the first recording tape cartridge to be structurally different than the second recording tape cartridge, and for each of the first recording tape cartridge and the second recording tape cartridge, preparing a case which rotatably accommodates a reel on which a recording tape is wound; and forming grasped portions, which the grasping device grasps from both sides, at side walls of the case;

making an interval between a first pair of corner portions of the grasped portions, of the first recording tape cartridge, the same as an interval between a first pair of corner portions of grasped portions of the second recording tape cartridge; and chamfering a second pair of corner portions of the grasped portions of the first recording tape cartridge; and making a height from a floor surface of the accommodating chamber to the grasped portions of the first recording tape cartridge, at a time when the first recording tape cartridge is accommodated in one of the accommodating chambers of the library, the same as a height from the floor surface of the one of the accommodating chambers to the grasped portions of the second recording tape cartridge, at a time when the second recording tape cartridge is accommodated in the one of the accommodating chambers, wherein forming the grasped portions of the first recording tape cartridge includes forming concave portions, and the method further comprises providing portions of the side walls of the case of the first recording tape cartridge to extend from the concave portions of the first recording tape cartridge, and further providing, at the case of the first recording tape cartridge, overhang portions which hang over further outwardly than the portions of the side walls that extend from the concave portions of the first recording tape cartridge, and which can be supported from beneath by the grasping device.

8. The method of claim 7, wherein the chamfering includes forming inclined walls, which are inclined at a predetermined angle, at the second pair of corner portions of the grasped portions of the first recording tape cartridge.

9. The method of claim 7, wherein the providing the overhang portions includes making the overhang portions to be reference surfaces, in a heightwise direction, for positioning of the first recording tape cartridge.

10. The method of claim 7, further comprising providing inclined walls at rear sides continuous from the side walls.

11. The method of claim 10, wherein providing the inclined walls includes making the inclined walls to be guide surfaces which can guide the grasping device to the concave portions of the grasped portions of the first recording tape cartridge.

12. The method of claim 7, wherein forming of the concave portions includes forming a depth of the concave portions to be one of substantially the same as and slightly deeper than a length of claw portions of the grasping device.

* * * * *